United States Patent [19]
Amini

[11] Patent Number: 5,643,470
[45] Date of Patent: Jul. 1, 1997

[54] CENTRIFUGAL FLOW SEPARATOR METHOD

[76] Inventor: Bijan K. Amini, 5110 San Felipe, Houston, Tex. 77056

[21] Appl. No.: 628,505

[22] Filed: Apr. 5, 1996

[51] Int. Cl.$^6$ ................................................. B01D 21/26
[52] U.S. Cl. ..................... 210/787; 210/788; 210/512.1; 209/725
[58] Field of Search ..................... 210/787, 788, 210/512.1; 209/715, 717, 718, 719, 725; 55/459.1, 459.3

[56] References Cited

U.S. PATENT DOCUMENTS

| 4,091,265 | 5/1978 | Richards et al. . |
| 4,354,946 | 10/1982 | Warlick . |
| 4,428,351 | 1/1984 | Davis . |
| 4,597,871 | 7/1986 | Okouchi et al. ...................... 210/512.1 |
| 4,840,732 | 6/1989 | Rawlins ................................. 210/512.1 |
| 4,997,556 | 3/1991 | Yano et al. ........................... 210/512.1 |

FOREIGN PATENT DOCUMENTS 513329  2/1955  Italy .

Primary Examiner—David A. Reifsnyder
Attorney, Agent, or Firm—Alton W. Payne

[57] ABSTRACT

A method of separating the constituents of a fluid where the constituents have different physical characteristics including mass, weight, coefficient of friction and the like. The method comprising impeding the flow of the fluid for causing the fluid to move in a curvilinear path. By moving in a curvilinear path, the fluid is effected by centrifugal forces. The centrifugal forces cause the separation of the constituents of the fluid. Further, the effected fluid is slowed for further enhancing separation of the constituents of the fluid.

2 Claims, 5 Drawing Sheets

CENTRIFUGAL FLOW SEPARATOR METHOD

FIELD OF THE INVENTION

The present invention relates generally to flow separating method. Specifically, the present invention relates to a centrifugal flow separator and method for separating the constituents of a fluid.

BACKGROUND OF THE INVENTION

Diesel fuel, hydraulic fluid and other fluids such as hydrocarbon fluids containing paraffin and/or water have long been used in association with automobiles, trucks, buses, tractors, power generators, construction equipment, ships and railroad locomotives. The use of diesel fuel has many significant advantages such as, for example, a generally reduced unit cost, a higher flash point, and increased fuel efficiency as compared to other forms of liquid fuel. Hydraulic fluid has numerous applications for use in power equipment, construction equipment and in the transportation industry.

Unfortunately, diesel fuel, hydraulic fluid and similar fluids have a major disadvantage, in that they contain other substances, such as water. However, the water separates from liquid diesel fuel, hydraulic fluid and similar liquids at undesirable times to cause many and varied problems, including clogged lines, frozen lines, unusable fuel and the like.

When diesel fuel is used by modern engines as a coolant, 80% of the fuel that goes to the engine is returned to the fuel tank at 140% Fahrenheit or above. The vapor from the hot fuel draws moisture from the ambient air. Upon cooling, the moisture precipitates and the fuel deposits the moisture on the tank walls. Therefore, in modern engine applications, diesel fuel, hydraulic fluid, hydrocarbons and similar fluids have an inherent presence of bound and free water in the fluids. At temperatures below 32° Fahrenheit, the water in these fluids begins to freeze and form ice crystals. The formation of ice also restricts the flow of fluid and adversely affects the operation of the equipment.

In an effort to prevent the formation of excessive water in diesel fuel, hydraulic fluid and other similar fluids several devices have been developed. Particularly, U.S. Pat. No. 4,676,895 to Davis entitled "Fluid Flow Baffle for Fuel Processor" is one such device. Other devices are described in U.S. Pat. No. 4,368,716 to Davis entitled "Fuel Processor Apparatus for Diesel Powered Vehicles" and U.S. Pat. No. 4,421,090 to Davis entitled "Fuel Processor Apparatus for Diesel Powered Vehicles." The devices described in the cited patents have had limited succes.

Prior art devices such as U.S. Pat. No. 4,421,090 to Davis teach directing a flow of mixed fluid down into a compartment for separating the water. Such teaching causes problems. One such problem is the separation and re-mixing of the fundamental parts of the fluid. Specifically, as described in the Davis patent, a mixture is directed down into a container to separate and stabilize the water in the mixture. Assume that the device has successfully stabilized a supply of water. The stationary water is agitated by the mixture being directed down into the container. The downward flow into the container or compartment containing the stationary water causes the stationary water to be agitated. The agitated water mixes with the new mixture entering the compartment to form a secondary water/hydrocarbon mixture. Thus, the separated water is re-entrained or re-mixed into a new water/hydrocarbon mixture. Also, the prior art devices taught in the cited and related patents produce a single plume. The prior art devices create a fan of fluid to prevent a single jetting effect. The jetting effect tends to further disperse and mix the separated water so as to create a secondary water/hydrocarbon mixture.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF THE INVENTION

To achieve the foregoing objects, features, and advantages and in accordance with the purpose of the invention as embodied and broadly described herein, a centrifugal flow separator and method for separating the constituents of a fluid is provided. A preferred method of separating the constituents of a fluid where the constituents have different physical characteristics including mass, weight, coefficient of friction and the like is provided. The method comprising the steps of impeding the flow of the fluid for causing the fluid to move in a curvilinear path. By moving in a curvilinear path, the fluid is effected by centrifugal forces. The centrifugal forces cause the separation of the constituents of the fluid. Further, the effected fluid is slowed for further enhancing separation of the constituents of the fluid.

In another preferred method of separating the constituents of a fluid where the constituents have different physical characteristics including mass, weight, coefficient of friction and the like, the method comprises the steps of placing the constituents of a fluid in motion, impeding the flow of the fluid for causing the fluid to move in a curvilinear path, impressing on the fluid centrifugal forces caused by the curvilinear path of the fluid, separating the constituents of the fluid caused by the centrifugal forces thereupon, slowing the motion of the flow of fluid moving in the curvilinear path, and further separating the constituents of the fluid caused by slowing the motion of the fluid.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

Figure 1:
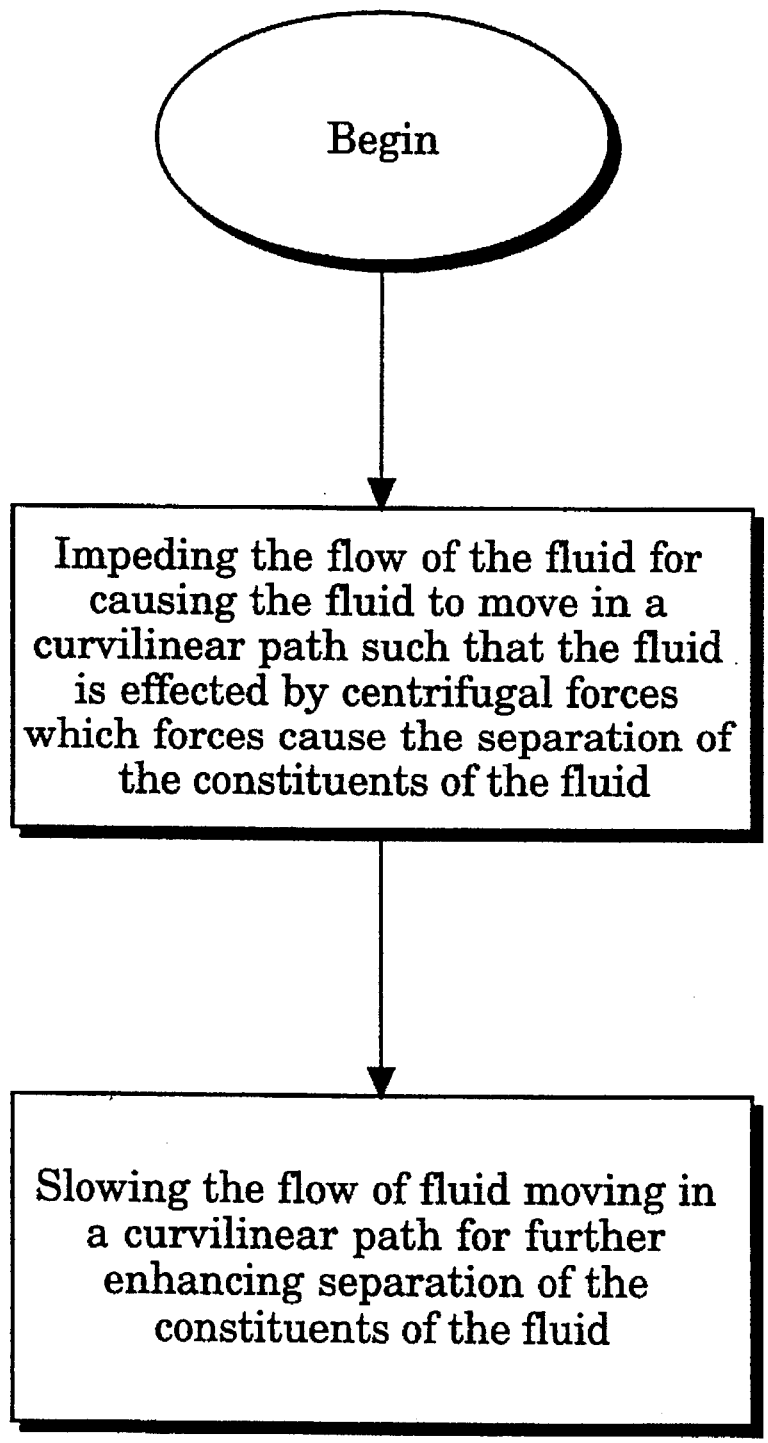
FIG. 1 is a flow chart illustrating an embodiment of the present invention.

FIG. 1 is a flow diagram that illustrates a preferred embodiment of the present invention. The method begins by impeding the flow of the fluid for causing the fluid to move in a curvilinear path. When the fluid moves in a curvilinear path, the fluid is effected by centrifugal forces. The centrifugal forces cause the separation of the constituents of the fluid. Also, the method of the present invention provides for slowing the flow moving in the curvilinear path. The slowing of the fluid provides for, and further enhances, the separation of the constituents of the fluid.

Figure 2:
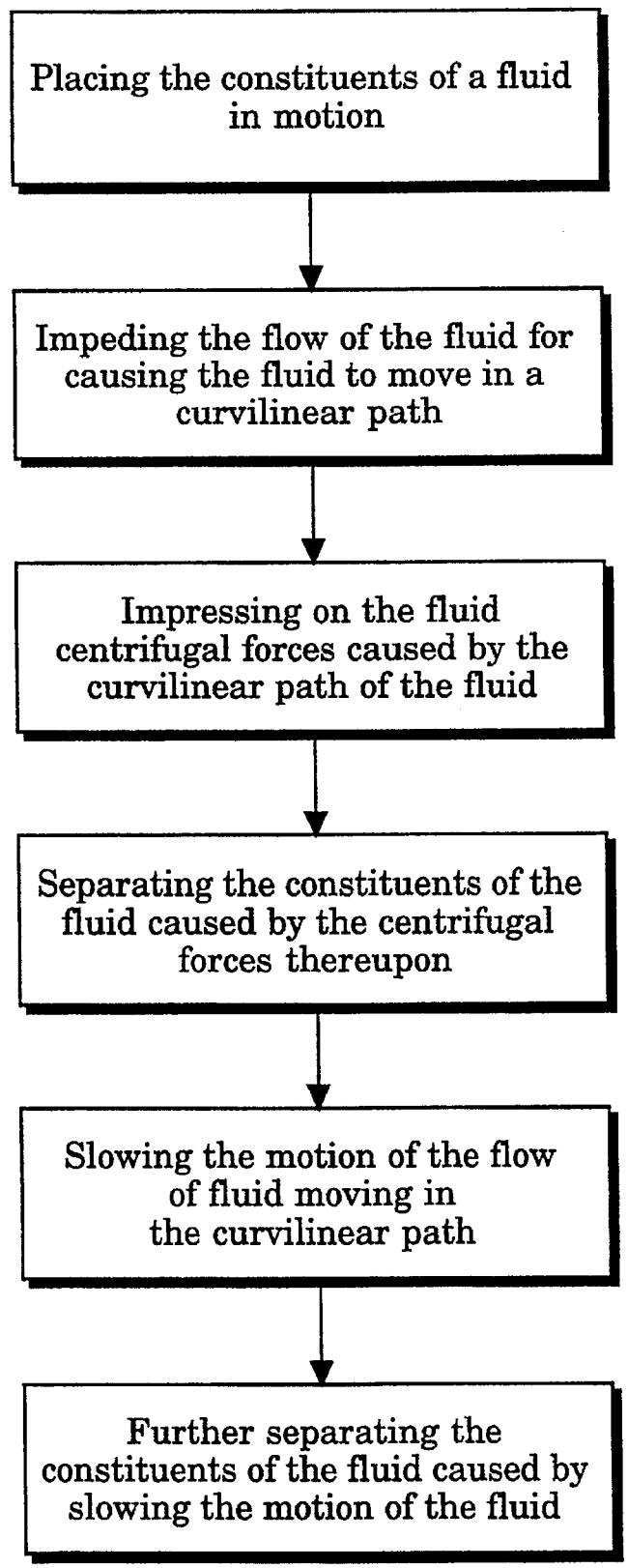
FIG. 2 is a flow chart illustrating a more detailed method of the present invention.

FIG. 2 is a flow diagram illustrating a more detailed embodiment of the method of the present invention. FIG. 2 provides for placing the constituents of a fluid in motion. The moving fluid is impeded in such a way as to cause the fluid to move in a curvilinear path. The movement of the fluid in a curvilinear path provides that centrifugal forces are impressed on the fluid and all constituents thereof. The centrifugal forces on the fluid cause the constituents to separate. The fluid that is experiencing separation is slowed. The slowing of the fluid further enhances the separation of the constituents of the fluid. The entire method provides for extremely effective fluid separation.

It can be appreciated that the physical characteristics of the fluid, for example water in a hydrocarbon mixture, can be greatly enhanced by separation. Also, the heater provides that the fluid is better conditioned for adapting the method of the present invention. For example, a cold fluid may not provide sufficient motion for creating the curvilinear path, thereby limiting the effectiveness of the method. However, the same fluid in a heated state can have greatly enhanced effects by using the method of the present invention.

Figure 3:
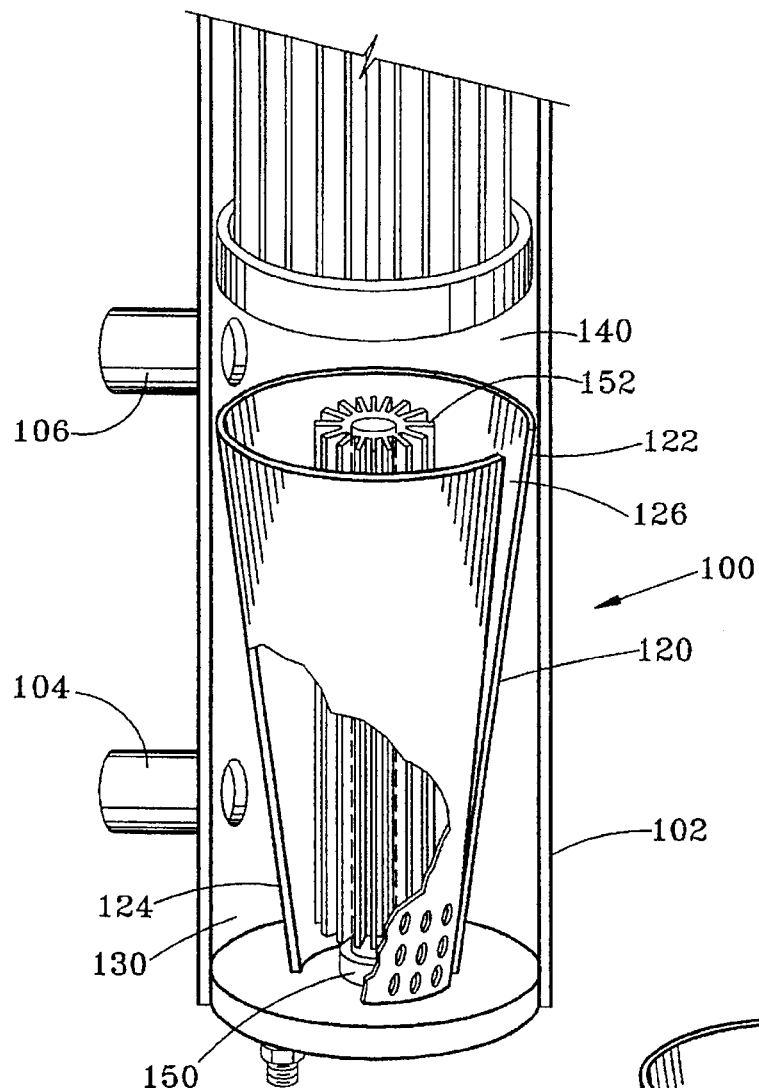
FIG. 3 is a perspective view illustrating a preferred embodiment of the present invention using a conical separator.
Figure 3A:
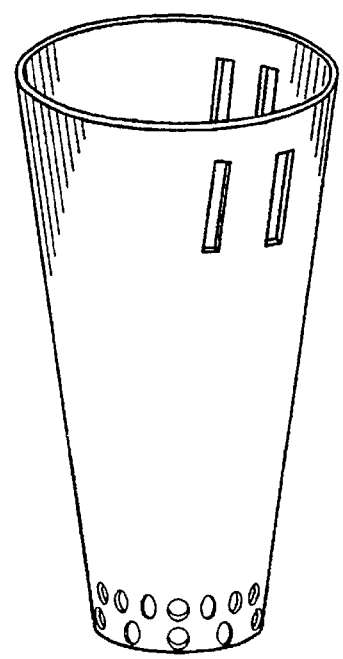
FIG. 3A is a perspective view illustrating another preferred embodiment of a conical separator practicing the present invention.

FIG. 3 is a sectional view of a preferred embodiment of a centrifugal flow separator 100 as practiced by the present invention. The separator comprises a housing 102 having an inlet 104 and an outlet 106. Inside the housing 102 is a conical separator 120 and a heater 150. The conical separator 120 is shaped to have a narrowed end 124 and a flared end 122. The conical separator 120 has one or more passages 126 which are preferably positioned to be remote from the inlet 104. The conical separator 120 divides the housing 102 into an exterior chamber 130 and an interior chamber 140. The interior chamber 140 contains the heater 150.

The heater 150 is preferably provided with a plurality of fins 152. Preferably, the fins 152 are arranged in a linear orientation. However, it can be appreciated that any fin arrangement would be appropriate for increasing the surface area between the heater 150 and any fluid within the interior chamber 140.

Figure 4:
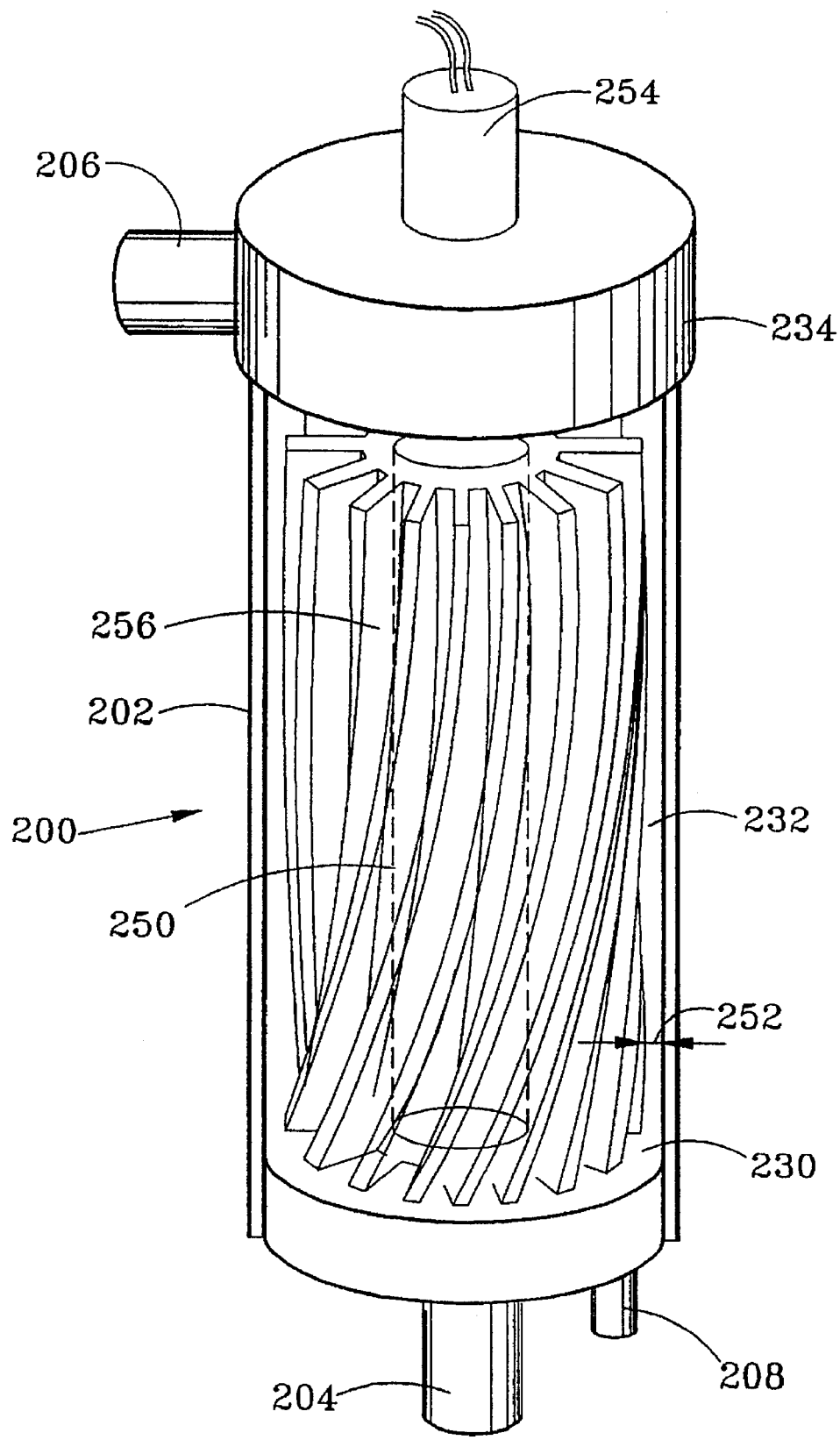
FIG. 4 is another preferred embodiment of the present invention using a helical separator.

FIG. 4 is another embodiment of the centrifugal flow separator of the present invention. FIG. 4 illustrates a separator 200 having a housing 202, an inlet 204 and an outlet 206. The housing 202 is schematically divided into a first chamber 230, a mid-chamber 232 and an end chamber 234. The mid-chamber 232 accepts a helical heater 250. The helical heater provides an orientation with the interior wall of the housing 202 for providing a gap 252 between the helical heater 250 and the housing 202. The helical heater 250 has associated therewith a heater element 254. The helical heater 250, in conjunction with the first chamber 230 and the mid-chamber 232, provides an impeding effect on the flow of fluid entering the inlet 204. The impeding effect causes the fluid to move in a curvilinear path. By moving in a curvilinear path, the fluid is effected by centrifugal forces. Also, the combination of the helical heater 250, the mid-chamber 232 and the gap 252 act to slow the flow of fluid moving in the curvilinear path for further enhancing the separation of constituents, such as for example, water from a hydrocarbon fluid.

The gap 252 provides a path in which the heavier separated fluid can flow between the interior wall of the housing 202 within the mid-chamber 232 and the heater 250, or in the gap 252. The lighter portion of the fluid is forced through the mid-chamber 232 into the end chamber 234 and out via the outlet 206. The heavier portion of the fluid egresses via the gap 252 into the first chamber 230 for removal via a water outlet 208.

Figure 5:
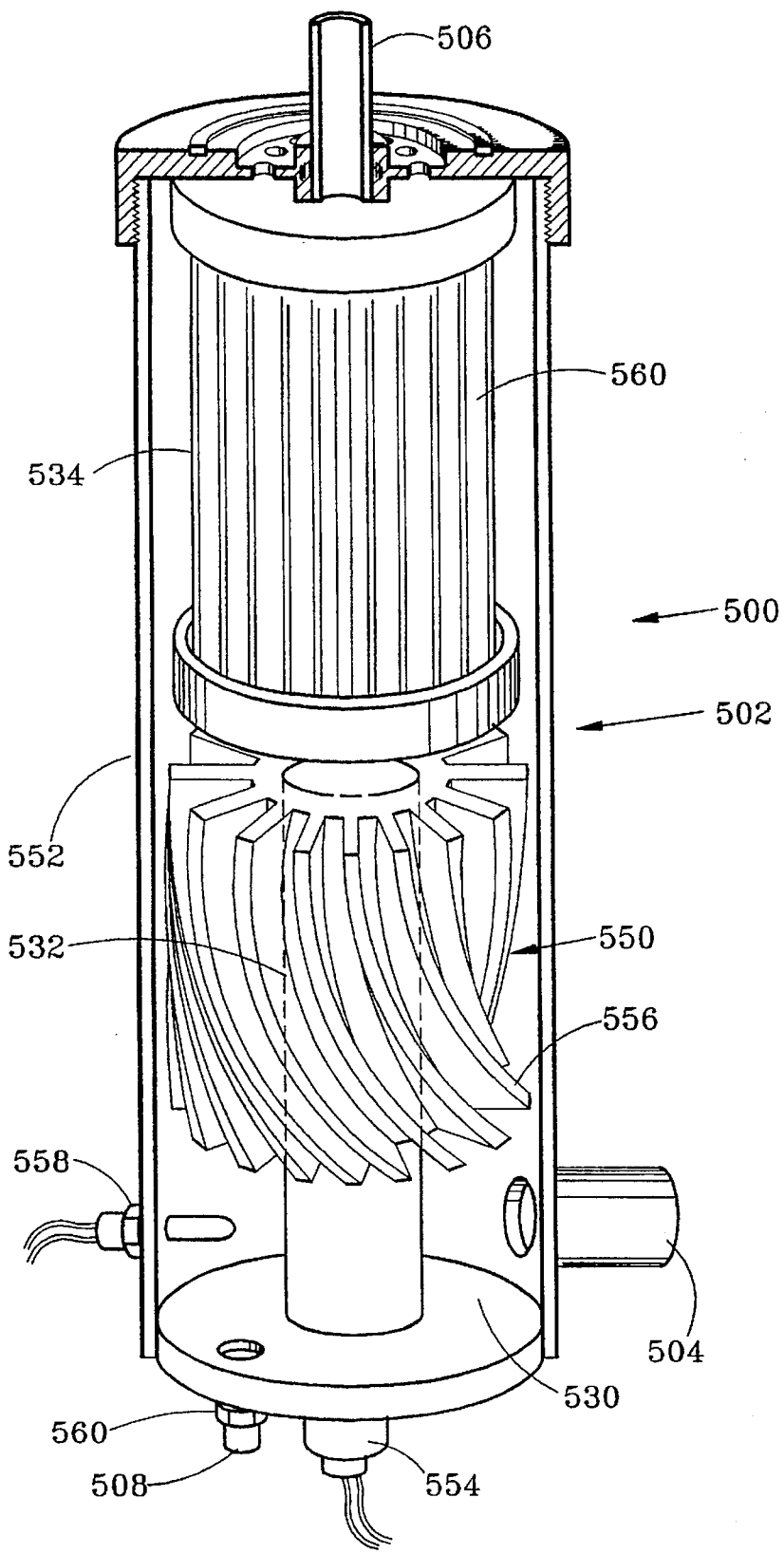
FIG. 5 is another embodiment of the present invention illustrating a helical separator in association with a filter.

FIG. 5 is a prospective view of another preferred embodiment of a separator 500 of the present invention. The separator 500 comprises a housing 502, an inlet 504, an outlet 506 and a water drain 508. The fluid having various constituents enters the inlet 504, passes through the housing 502, and a portion thereof exits the outlet 506. Another portion of the entering fluid is removed through the water drain 508.

In FIG. 5, the housing 502 encloses a first chamber 530, a mid-chamber 532 and an end chamber 534. The first chamber 530 typically acts as a plenum for receiving the in flowing fluid through the inlet 504. The mid-chamber 532 contains a spiral heater 550. The spiral heater 550 preferably has a plurality fins 556. The spiral heater 550 is displaced from the inner wall of the housing 502 by a gap 552. The end chamber 534 receives a filter 560 for removing particulate and the like from the fluid prior to exiting the outlet 506. The housing 502 can be adapted for having a disengaging portion 510. The disengaging portion 510 could be a threaded device or any other means for holding the housing 502 together.

As the fluid enters the inlet 504, it fills the first chamber 530. The fluid is forced up around the spiral heater 550 so as to fill the spaces between the fins 556 forcing the flow of the fluid into a curvilinear path. The curvilinear path causes the fluid to be effected by centrifugal forces. The centrifugal forces cause fluid constituents with differing physical characteristics to separate. Also, the fins 556 and the spiral heater 550 act to slow the flow of fluid moving in a curvilinear path for further enhancing the separation of the constituents. As heavier material is separated from the flow of fluid, the lighter material is forced up into the end chamber 534. The heavier portion of the fluid, for example water in a water hydrocarbon mixture, egresses back into the first chamber 530 via the gap 552. The first chamber 530 has the water drain 508 and a water sensor 560. As the level of water increases in the first chamber 530, the sensor 560 acts to automatically open the water drain 508, or alternately, acts to give an indication that the water should be drained from the first chamber 530 via the water drain 508. The remaining fluid is caused to ingress into the end chamber 534, and be passed through the filter 560. The separated and cleaned fluid flow egresses through the outlet 506.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method of separating more dense constituents of a fluid from less dense constituents of a fluid, a housing is provided having a first end, a second end, a wall there between and an inlet in the wall adjacent the first end, the housing comprising therein an exterior chamber and an interior chamber separated by a conical baffle, the conical baffle arranged in the housing such that the exterior chamber decreases in volume from the first end to the second end of the housing, the method comprising the steps of:

(a) impeding the flow of the fluid accepted in the exterior chamber of the housing via the inlet and causing the fluid to move in a curvilinear path by the fluid striking the conical baffle such that the fluid is effected by centrifugal force which force enhances the separation of the fluid constituents, and (b) reducing the centrifugal force by the fluid migrating from the first end of the housing to the second end of the housing such that the fluid moves into a portion of the exterior chamber having increasing volume to further enhance the separation of the constituents of the fluid.

2. The method as defined in claim 1 further comprising the step of decelerating the fluid such that the more dense fluid constituents move in a radial direction with respect to the centrifugal force and in a downward direction with respect to gravity.

* * * * *